United States Patent
Hu et al.

(10) Patent No.: US 10,081,360 B2
(45) Date of Patent: Sep. 25, 2018

(54) VEHICLE PROPULSION SYSTEMS AND METHODS

(71) Applicant: GM GLOBAL TECHNOLOGY OPERATIONS LLC, Detroit, MI (US)

(72) Inventors: Yiran Hu, Shelby Township, MI (US); Steven E. Muldoon, Royal Oak, MI (US); Jun-mo Kang, Ann Arbor, MI (US); Chen-fang Chang, Bloomfield Hills, MI (US); Dongxu Li, Troy, MI (US); Junfeng Zhao, Troy, MI (US); Jay H. Sim, Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/246,889

(22) Filed: Aug. 25, 2016

(65) Prior Publication Data

US 2018/0057001 A1    Mar. 1, 2018

(51) Int. Cl.
| | |
|---|---|
| B60T 7/12 | (2006.01) |
| B60W 30/16 | (2012.01) |
| B60R 16/023 | (2006.01) |
| B60W 30/18 | (2012.01) |
| B60W 40/04 | (2006.01) |
| B60W 50/16 | (2012.01) |
| G08G 1/01 | (2006.01) |
| G08G 1/0968 | (2006.01) |
| B60K 35/00 | (2006.01) |
| B60K 37/00 | (2006.01) |

(Continued)

(52) U.S. Cl.
CPC ........ *B60W 30/162* (2013.01); *B60K 35/00* (2013.01); *B60K 37/00* (2013.01); *B60R 16/0236* (2013.01); *B60W 30/181* (2013.01); *B60W 30/18154* (2013.01); *B60W 40/04* (2013.01); *B60W 50/16* (2013.01); *G06K 9/00791* (2013.01); *G08G 1/0137* (2013.01); *G08G 1/0962* (2013.01); *G08G 1/096805* (2013.01); *B60W 2050/143* (2013.01)

(58) Field of Classification Search
USPC .................................................... 701/96
See application file for complete search history.

(56) References Cited

U.S. PATENT DOCUMENTS 6,405,106 B1    6/2002   Sheth et al.
8,192,327 B2    6/2012   Gibson et al.
(Continued)

OTHER PUBLICATIONS

Tahmasbi-Sarvestani, A., et al. "System Architecture for Cooperative Vehicle-Pedestrian Safety Applications Using DSRC Communication" SAE Technical Paper 2015-01-0290, 2015.
(Continued)

*Primary Examiner* — Tyler D Paige
(74) *Attorney, Agent, or Firm* — Quinn IP Law

(57) ABSTRACT

A vehicle engine system includes a combustion engine configured to provide a propulsion torque to satisfy a propulsion demand in response to a driver input. The engine system also includes a controller programmed to receive data indicative of at least one upcoming driving event, and issue a command to impart a predetermined velocity profile based on the upcoming driving event. The predetermined velocity profile is arranged to optimize a performance attribute of the combustion engine and preempt the driver input.

14 Claims, 6 Drawing Sheets

(51) Int. Cl.
   *G06K 9/00*      (2006.01)
   *G08G 1/0962*    (2006.01)
   *B60W 50/14*     (2012.01)

(56) References Cited

U.S. PATENT DOCUMENTS

| | | | |
|---|---|---|---|
| 8,195,394 B1* | 6/2012 | Zhu | G01C 21/26 |
| | | | 382/107 |
| 8,239,076 B2 | 8/2012 | McGarry et al. | |
| 8,290,637 B2 | 10/2012 | Krupadanam et al. | |
| 8,392,112 B2 | 3/2013 | Bradburn et al. | |
| 8,606,483 B2 | 12/2013 | Krupadanam et al. | |
| 9,067,589 B1 | 6/2015 | Zhao et al. | |
| 9,121,722 B1 | 9/2015 | Yu et al. | |
| 9,174,575 B2* | 11/2015 | Mitts | B60Q 5/006 |
| 2004/0193347 A1* | 9/2004 | Harumoto | B60R 21/0132 |
| | | | 701/45 |
| 2006/0064232 A1 | 3/2006 | Ampunan et al. | |
| 2006/0095195 A1* | 5/2006 | Nishimura | B60W 30/025 |
| | | | 701/96 |
| 2006/0187086 A1* | 8/2006 | Quintos | B60T 7/22 |
| | | | 340/936 |
| 2009/0312889 A1* | 12/2009 | Krupadanam | B60L 11/1859 |
| | | | 701/1 |
| 2011/0112740 A1* | 5/2011 | Hashimoto | F02D 17/02 |
| | | | 701/70 |
| 2013/0297124 A1* | 11/2013 | Be | G06F 17/00 |
| | | | 701/22 |
| 2014/0139369 A1* | 5/2014 | Baba | G01S 13/50 |
| | | | 342/146 |
| 2015/0084758 A1* | 3/2015 | Mitts | B60Q 5/006 |
| | | | 340/438 |
| 2017/0261991 A1* | 9/2017 | Raghu | G05D 1/0217 |

OTHER PUBLICATIONS

U.S. Department of Energy, "Driving More Efficiently", https://www.fueleconomy.gov/feg/driveHabits.jsp.

Windover, P.R., et al. "Stop and Restart Effects on Modern Vehicle Starting System Components", Longevity and Economic Factors, Apr. 2015.

* cited by examiner

VEHICLE PROPULSION SYSTEMS AND METHODS

TECHNICAL FIELD

The present disclosure relates to controls of vehicle propulsion systems.

INTRODUCTION

Vehicle connectivity provides data-rich information sources which have been used for user convenience and safety features. Additionally the proliferation of vehicle onboard sensors provides an additional layer of information. Propulsion system operation largely remains constant in spite of the availability of such information. Any adjustments are often reactive in nature and may result in less than fully optimal propulsion system operation.

SUMMARY

A vehicle engine system includes a combustion engine configured to provide a propulsion torque to satisfy a propulsion demand in response to a driver input. The engine system also includes a controller programmed to receive data indicative of at least one upcoming driving event, and issue a command to impart a predetermined velocity profile based on the upcoming driving event. The predetermined velocity profile is arranged to optimize a performance attribute of the combustion engine and preempt the driver input.

A method of controlling a vehicle propulsion system includes receiving a driver input indicative of torque demand and receiving data indicative of at least one of static route data and dynamic route data. The method also includes forecasting an upcoming driving event based on the received data. The method further includes adjusting an engine output torque to optimize a performance parameter according to a selected propulsion mode and preempt the driver input.

A vehicle includes a combustion engine to provide a propulsion torque to satisfy a driver propulsion demand and at least one sensor to detect an object within a vicinity of the vehicle. The vehicle also includes a controller programmed to detect an intersection condition prompting the vehicle to stop. The controller is also programmed to detect a presence of a moving object in a vicinity of the vehicle and calculate a first duration of time that the moving object will remain within the vicinity while the vehicle is stopped. The controller is further programmed to deactivate the engine in response to the duration of time being greater than a predetermined time threshold.

An engine control system is provided for a combustion engine of a motor vehicle, the combustion engine being configured to output torque in response to driver input indicative of a propulsion demand. The engine control system includes a controller programmed to receive data indicative of at least one upcoming driving event, and generate user guidance according to a predetermined torque profile based on the upcoming driving event. The predetermined torque profile is adapted to optimize a performance attribute of the combustion engine and the user guidance instructs a driver of driving actions to adhere to the predetermined torque profile.

DETAILED DESCRIPTION

Figure 1:
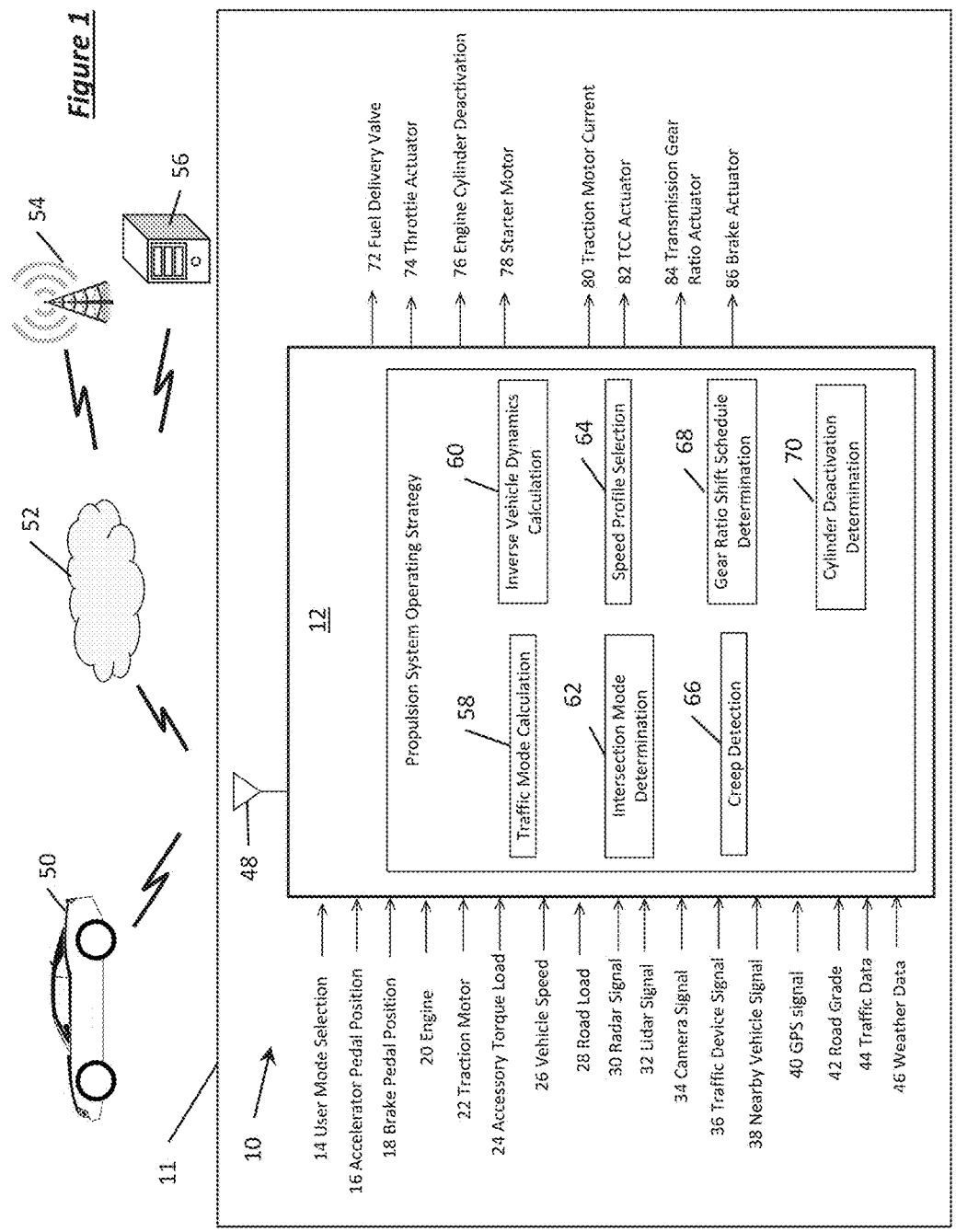
FIG. 1 is a system diagram of a propulsion control system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Connected and/or automated vehicles (CAVs) create additional opportunities to further reduce energy consumption and energy-related emissions. These opportunities may relate to a synergic combination of the advance in-vehicle propulsion system control technologies which utilize vehicle connectivity and automation technologies. Disclosed herein is an optimal and practical solution that incorporates connectivity information into current vehicle control systems to design an "information rich" propulsion control systems that co-optimize the vehicle dynamics and engine performance. In some examples, a propulsion system controller proactively seeks the opportunities, within the constraints of emissions and driveability, to execute most fuel-efficient propulsion system operations including, but not limited to, combinations of running at "sweet spots" (i.e,, efficient engine operating points), aggressive deceleration fuel cutoff, aggressive start-stop, aggressive cylinder deactivation, smart transmission shift, smart accessory load management, and smart thermal management. The systems and methods discussed herein are adaptable and thus sensitive to the large array of driving scenarios encountered in the real-world and the relative frequency of such scenarios.

The preview nature of the additional information, e.g., the status of a traffic signal before vehicles reach an intersection; traffic, weather, and accident information, enables the design of the propulsion system controller to plan ahead in order to (i) optimize total vehicle energy usage, (ii) cascade anticipated speed and torque request to lower-level controllers and actuators, and (iii) execute the most efficient propulsion system operations.

Motor vehicles may include different levels of autonomy, ranging from fully manual driving modes to fully autonomous modes with little driver interaction. In full manual examples, the control strategies may interact with driver inputs and expectations of vehicle responses. Therefore one aspect of the present disclosure is utilizing opportunities to preempt certain driver inputs in such a way that is transparent to the driver, yet yields the benefit of optimizing one or more operating parameters of the propulsion system.

The various propulsion system components discussed herein may have one or more associated controllers to control and monitor operation. Referring to FIG. 1, a vehicle propulsion control system 10 includes a controller 12 to manage propulsion of vehicle 11. Controller 12, although schematically depicted as a single controller, may be implemented as one controller, or as system of controllers in cooperation to collectively manage the propulsion system. Communication between multiple controllers, and communication between controllers, actuators and/or sensors may be accomplished using a direct wired link, a networked communications bus link, a wireless link, a serial peripheral interface bus or any another suitable communications link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. In a specific example, multiple controllers communicate with one another via a serial bus (e.g., Controller Area Network (CAN)) or via discrete conductors. The controller 12 includes one or more digital computers each having a microprocessor or central processing unit (CPU), read only memory (ROM), random access memory (RAM), electrically-programmable read only memory (EPROM), a high speed clock, analog-to-digital (A/D) and digital-to-analog (D/A) circuitry, input/output circuitry and devices (I/O), as well as appropriate signal conditioning and buffering circuitry. The controller 12 may also store a number of algorithms or computer executable instructions needed to issue commands to perform actions according to the present disclosure.

The controller 12 is programmed to monitor and coordinate operation of the various propulsion system components. The controller 12 is in communication with an engine and receives signals 20 indicative of engine at least rotational speed (RPM), temperature, pressure, and exhaust composition. The controller may also receive other signals pertaining to the state of the engine and its operating conditions. In the case of a hybrid propulsion system having both an engine and an electric machine as propulsion sources, the controller 12 is also in communication with the traction electric machine and receives signals 22 indicative of motor speed, torque, temperature, current draw, and voltage across the motor. The controller 12 also receives signal 14 indicative of a user selection of any of various propulsion system operation modes. The controller 12 is communication with one or more sensors at driver input pedals to receive signals indicative of pedal position which may reflect both positive and negative acceleration demand provided by the driver. The driver input pedals sensors may output accelerator pedal signal 16 and a brake pedal signal 18. In certain alternative examples, such as a self-driving autonomous vehicle, acceleration demand may be determined by a computer that is either on-board or off-board of the vehicle 11 without driver interaction. The controller also receives signals 24 indicative of accessory loads which may be driven by propulsion system output, vehicle speed signal 26, and road load signal 28 indicating torque output at the vehicle wheels.

The controller also receives a number of signals from onboard signals, such as radar signals 30, lidar signals 32, and camera signals 34. As discussed in more detail below, the onboard sensors may be used to sense the environment around the vehicle 11 and inform decisions regarding propulsion system operation.

The controller further receives data signals from external sources. Signal 36 from infrastructure traffic devices indicates current and upcoming states of such devices. Signal 38 from nearby vehicles 50 may include information such location, speed, and route information of other vehicles. A GPS signal 40 provides the location of the host vehicle 11. The controller 12 may further be in communication with a cellular network 54 or satellite to obtain a global positioning system (GPS) location. Road grade signal 42, traffic data signal 44, and weather data signal 46 each may be received at the vehicle 11 and include information about the upcoming route of the host vehicle.

Based on the various input signals received by the controller, a processor is programmed to execute one or more algorithms to control operation of the propulsion system. An operating system is stored at the controller 12 to monitor and regulate operation of the components of the propulsion system. The operating system may include a traffic mode calculation algorithm 58 to determine external traffic conditions and implement optimal engine operation based on the forecasted conditions. Algorithm 60 uses vehicle dynamics to calculate required torque at the vehicle wheels, or road load, based on the external conditions. Algorithm 62 may be employed to automatically determine when the host vehicle 11 is stopped at an intersection. Algorithm 64 may be used to select a predetermined speed profile based on the forecasted driving events. Algorithm 66 automatically detects high traffic congestion creep conditions and adjusts engine operation to optimize for the low-speed stop and go driving. Algorithm 68 includes a number of different shift schedules for the transmission gear ratio, and shifting may be adjusted based on the forecast driving conditions. Algorithm 69 includes vehicle parameter adaptation calculations to determine adjustments for key vehicle parameters such as weight and tire friction to implement optimal powertrain operation. Algorithm 70 includes logic to selectively deactivate any of the combustion cylinders of the engine when low torque output is required. Algorithms 58, 60, 62, 64, 66, 68, 69, and 70 are each described above as independent features. However, it should be appreciated that certain aspects of the features include functional overlap and therefore may be combined into more comprehensive overarching algorithms.

With continued reference to FIG. 1, the controller 12 provides several output signals to influence the operation of the propulsion system and other component which influence vehicle dynamics. The controller 12 may control engine operation by control signal 72 which regulates fuel volume flow to the engine, control signal 74 to control airflow though the throttle, a control signal 76 to control engine cylinder deactivation, as well as control signal 78 which triggers engine start and restart. In the case of a hybrid propulsion system, the controller outputs control signal 80 to regulate the amount of current provided to the traction electric machine. The controller also provides signals to influence transmission operation such as a torque converter clutch control signal 82, and a gear ratio shifting actuator control signal 84. The controller also may regulate friction brakes with control signal 86 to manage vehicle deceleration.

An optimized propulsion system control strategy may be used in connected vehicles having a combustion engine to apply any of multiple driving profiles. Depending on the desired objective, any of several different fuel consumption modes may be implemented affect operation of the propulsion system. For example, an "eco" mode may be configured to minimize fuel consumption. The eco mode is discussed by way of example in the present disclosure, however different fuel consumption modes may be selectively employed to achieve and of a number of objectives. A performance mode may be configured to maximize propulsion system output and/or driving dynamics. According to additional examples, modes may be configured to optimize traffic flow and minimize stops across a population of vehicles nearby the host vehicle 11. Optimized control for CAV propulsion systems according to the present disclosure supports various fuel economy optimization strategies to maximize fuel economy during frequently used real-world vehicle maneuvers.

Sub-strategies such as an eco-approach, eco-departure and/or speed harmonization strategies may be employed under certain driving scenarios or maneuvers. Such strategies are effective to more fully utilize available data to achieve better real-world fuel efficiency. Several different control features can be further coordinated to improve fuel economy. For example, any combination of deceleration fuel cutoff (DFCO), engine stop-start, modified transmission shift schedule, limitation of acceleration torque request, and cylinder deactivation can be applied to further the objective of fuel consumption optimization preempting a driver torque request. According to certain examples a speed profile may be selected to fine tune fuel consumption during at least deceleration approaching a known stop, departing from a stop where upcoming traffic conditions are known, and various other typical traffic flow conditions.

The controller may store one or more algorithms to receive signals indicative of traffic data as well as signals from onboard sensors in order to predict upcoming traffic events. Consolidation of data from nearby devices using vehicle-to-infrastructure (V2I) communications, data from other vehicles 50 using vehicle-to-vehicle (V2V) communications, as well as data from external servers 56 using wireless communications (e.g., traffic flow data) is consolidated to generate a forecasted distance from a given vehicle location to an upcoming stopping location.

The controller may be programmed to determine optimal engine torque after an upcoming stop is predicted, then apply a predetermined profile to influence vehicle deceleration. The controller may also be programmed to determine an optimal engine coast down approaching an upcoming stop. The controller may be further programmed to use data indicative of upcoming traffic conditions to determine an optimal acceleration strategy departing a stop based. The controller may be further programmed to adapt any of various velocity profiles based on learned vehicle weight and road grade information. The controller may be further still programmed to modify any of various velocity profiles to harmonize vehicle speed with other nearby vehicles based on traffic flow conditions.

During a conventional approach to a vehicle stop, all of the kinetic energy of the vehicle could be wasted through the brake system, which not only results in suboptimal fuel efficiency of the vehicle but also wear of the brake system as well. According to at least one example, preview information received via vehicle connectivity is used to minimize lost energy by forecasting a stopping event as early as possible, then coordinating vehicle and powertrain control systems to reduce energy consumption. Forecasting the stopping event as early as possible minimizes the fuel consumption by allowing the vehicle to run at most efficient powertrain operating modes and maximize the recovery of potential energy through coasting. Data from onboard sensors (e.g., radars, lidars, cameras), infrastructure devices (e.g., signalized traffic lights, traffic flow monitoring systems), as well as other vehicles are aggregated to provide the prediction of the vehicle stop.

Once a stopping event is forecasted, the propulsion system control will converge towards an optimal vehicle speed profile to support management of engine functions. Specifically, the approach of a stop can be broken down into two segments of operation. During the first segment of operation, positive torque might still be required from the powertrain since the vehicle is too far away to coast to the stopping location. In this segment, the proposed strategy is to operate the vehicle near the most fuel-efficient operating condition considering the permissible speed limit regulations (upper and lower) as well as traffic flow. This also includes optimizing a cylinder deactivation function for the combustion engine. At the same time, a model-based controller algorithm continues to forecast the propulsion system torque demand from the current vehicle position until the stopping location. Once positive engine torque is no longer required (i.e., the vehicle has enough kinetic energy to coast to stop at the stopping location), the fuel is shut off immediately (i.e., aggressive DFCO) and the vehicle is allowed to coast to a stop during the second segment of operation. Under many existing DFCO strategies without forecast information, the engine is refueled after vehicle and/or engine speed drops below a calibrated threshold. Using the forecasted stop information according to the present disclosure, refueling can be bypassed altogether, thus using substantially no fuel at all during the entire stopping process.

Additional fuel-saving features may also be employed during eco-approach. For example, to maximize the utilization of vehicle kinetic energy, the transmission can be placed into neutral to remove the "engine braking" effect during coasting. Removal of the engine braking effect allows for longer coasting distances, thus maximizing fuel savings when stop is sufficiently forecasted. The forecasting algorithm also takes into consideration the road grade ahead since the ability to coast may be heavily influenced by the road grade. The torque forecasting algorithm includes a portion to determine the optimal timing to implement coasting. It should be appreciated that under certain conditions, it may be desirable to maintain engine braking to minimize mechanical braking (e.g., when a traffic stopping event is forecasted too late for an extended coast).

Figure 2:
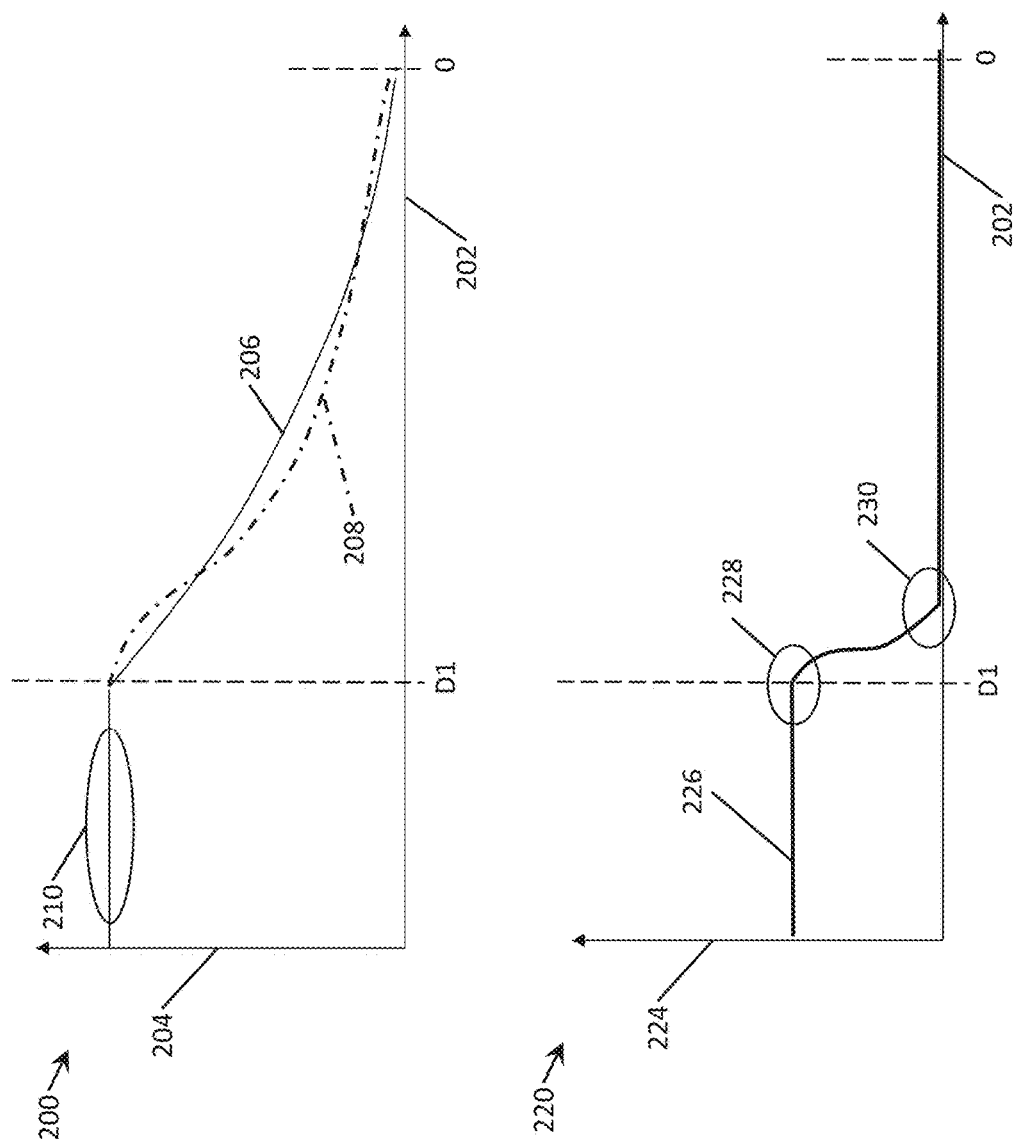
FIG. 2 is a plot of a vehicle deceleration event.

Referring to FIG. 2, a graphical representation of an example traffic stopping event is depicted. Plot 200 represents an example velocity profile and plot 220 represents a corresponding engine speed profile during the same event. Horizontal axis 202 represents travel distance along the stopping event and vertical axis 204 represents vehicle velocity. Curve 206 represents a predetermined target velocity profile, and curve 208 represents an actual velocity profile during deceleration. Vertical axis 224 of plot 220 represents engine speed. Curve 226 is a desired engine speed profile during the stopping event.

At about location 210, an upcoming stopping event is detected as discussed above. The controller may recognize and opportunity to engage in an eco-approach towards the vehicle stop location. When stop is predicted but positive engine torque is still required (e.g. stop is too far away to coast), vehicle speed can be optimized to maximize engine efficiency by operating near a "sweet spot" operating condition. The controller may calculate a distance D1 from the stop location to apply a desired deceleration profile. At distances closer than D1 to the stop location, engine torque may no longer required. Enhanced engine fuel cutoff and shutdown strategy can be applied once engine torque is no longer positive. At location 210, fuel is cutoff from the engine at distance D1, and speed of the engine begins to decrease. Once speed of the engine is substantially zero at location 230, fuel-less coast down may occur during the stopping event. Based on certain variable inputs such as road conditions and driver inputs, actual deceleration according to curve 208 may vary from the desired approaching velocity profile 206. The controller may be programmed to correct friction braking and/or engine braking to maintain a convergence to the ideal deceleration velocity profile. This approach fully utilizes vehicle momentum and concurrently minimizes braking usage.

Figure 3:
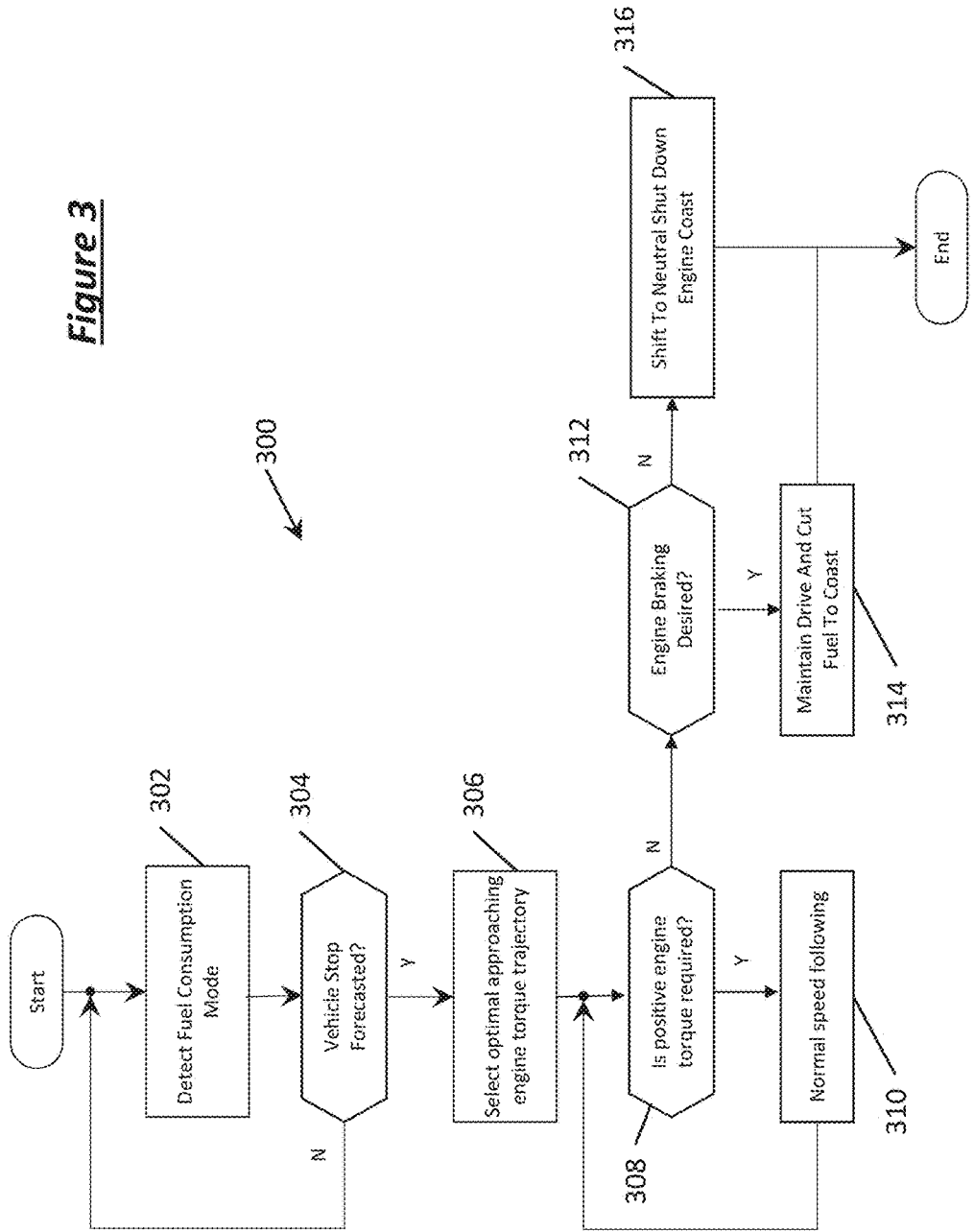
FIG. 3 is a flow chart of a control algorithm of a vehicle deceleration event.

Referring to FIG. 3, a method 300 is an example control logic of an algorithm to perform an eco-approach to a stop location. At step 302 the controller assesses which of the plurality of available fuel consumption modes is in effect to govern engine operation. As described above, "eco" modes are discussed herein by way of example, but any of a number of different functional objectives may be used to influence engine operation. The algorithm determines at step 304 whether an upcoming stopping condition is forecast. If no stop is forecast at step 304, the algorithm may cause the controller to return the beginning of the method and continue to monitor for the existence of a vehicle stop forecast.

At step 306 the algorithm selects an optimal deceleration profile to approach the stop condition based on the particular fuel consumption mode in effect. The particular profile chosen influences the distance from stop at which the algorithm engages the optimized approach portion of the method. The deceleration profile may include a predetermination of at least one of an ideal velocity profile and an ideal engine torque profile.

The algorithm determines at step 308 whether the desired vehicle velocity still requires positive torque to propel the vehicle. As discussed above, an optimal deceleration profile may include steady propulsion near an initial portion until the vehicle approached a desirable distance from the stop point. If positive torque is still required at step 308, the algorithm causes the engine to operate according to a normal speed demand at step 310, then continue to monitor until positive engine torque is no longer required.

If propulsion torque is no longer required from the engine at step 308, the algorithm determines at step 312 whether the magnitude of deceleration desired according to the predetermined velocity profile is sufficient to warrant engine braking to assist in slowing the vehicle. If engine braking is warranted at step 312, the algorithm causes at step 314 the engine to remain in drive gear to maintain resistive drag due to the rotation of the driveline causing the engine to turn. At the same time the algorithm may cause fuel supply to the engine to be cut off to preserve fuel during the deceleration event.

If the predetermined velocity profile is such that engine braking is not desired at step 312, the algorithm may cause the engine to shift to a neutral gear at step 316 to remove torque resistance of the engine allowing the propulsion system to coast to a stop.

According to another vehicle operation example using energy consumption reduction strategies is adjusting engine operation when accelerating away from a stop. In the case of departing from rest, heavy acceleration consumes a greater volume of fuel leading to degraded fuel economy. According to aspects of the present disclosure, automatically controlling vehicle speed commensurate with the traffic conditions may improve fuel economy without adversely affecting driver performance expectations. A less than aggressive predetermined acceleration speed profile can be used in heavy traffic without negative consequences where an upcoming stopping condition is forecast. However, similar to the approach case discussed above, optimizing vehicle speed alone may not yield the full fuel-saving benefits achievable with connectivity information. In particular, well-coordinated propulsion system control strategies may be used to further contribute to increased energy savings such as: 1) a more rapid upshift schedule applied to the transmission (including skipping some lower gear ratios), 2) earlier lockup of torque converter, and 3) launching the vehicle in higher gears.

For vehicle departure from a stop, the controller may store one or more algorithms to intelligently select and execute a blend of strategies using the data acquired through vehicle connectivity. A possible control architecture in this case is one where the traffic condition is first assessed by a fusion of the various sources of connectivity information. According to one example, the traffic condition can be assessed as a numerical value between 0 and 1, where 0 corresponds to no traffic and 1 corresponds to heavy traffic. The heavy traffic condition may imply a particular likelihood of an imminent stop or significant deceleration. An imminent stop or slowdown condition may also be directly sensed based on the speed behavior of one or more preceding vehicles. The traffic assessment may be used by the controller to apply acceleration control according to a predetermined speed profile based on the forecasting of an upcoming driving event. And, the controller selects the best engine operating strategy to complement the desired speed trajectory. In a specific use case, once a stop-and-go cyclic traffic condition is detected, vehicle acceleration may be limited in the "go" portions of the cycle based on conserving fuel without adversely affecting driver expectations.

In some examples control algorithms may apply to the operation of a single vehicle in isolation as well as to the operation of the same vehicle in a group of collaborating vehicles. One example of speed harmonization of vehicles avoids undulations in the traffic flow, through use of connectivity and/or predictive information regarding the travel path and road conditions. According to aspects of the present disclosure, extensions of this basic application can be exploited through an integrated propulsion system control scheme that includes the use of the connectivity information to advance or delay particular powertrain mode changes. For example, predicted vehicle driving events may be used to influence operation of the propulsion system to optimize for any of a number of performance attributes. For a given temporal or conditional vehicle event horizon, connectivity information can be aggregated and used in a coordinated manner allowing powertrain controls to engage or disengage cylinder deactivation, manage engine accessory loads in a more efficient manner, more aggressively apply DFCO, change transmission shifting strategies, and select optimal engine operating points. This information enabled and coordinated operating points and modes of powertrain control may be optimized for a given vehicle dynamics state rather than reactive to a generally unpredictable torque demand conveyed to the powertrain in real-time.

In the case of a forecasted congested traffic condition, a homogeneous speed may be broadcast such that a collection of vehicles converges to the single speed to reduce undulations in traffic flow. According to the systems and methods of the present disclosure, the engine controller may be configured to apply a predetermined speed profile to adjust from the current speed to the homogenous speed such that fuel consumption waste is minimized during the transition.

In one example, the vehicle speed profile is limited so as not to overshoot the homogenous speed in the time prior to the application of the homogeneous speed. Additionally, if the current speed is greater than the homogenous speed, aggressive coast-down features may be employed to manage energy during the transition.

In further examples, an engine stop-start feature may be configured to deactivate the engine as opposed to idling while the vehicle is stopped to conserve fuel. The strategy may include limiting engine deactivation to only those situations where the fuel saved over the time which the engine is deactivated exceeds the fuel consumed by an engine restart. The controller may be programmed to deactivate the engine at a stop only when it is forecast that the vehicle will be stopped for a duration of time greater than a predetermined time threshold. In one example, an engine consumes a volume of fuel during a restart equal to about an amount consumed during 10 seconds of engine idling. Thus, the controller may be programmed to only cutoff the engine at a stop when it is forecast that the vehicle will be stopped for longer than 10 seconds. While an example duration is provided by way of example, it should be appreciated that the value crossover threshold may vary from vehicle to vehicle, as well as vary under different operating conditions of a single host vehicle. The controller may include one or more algorithms to determine a time threshold based on the current operating conditions to determine whether or not to cutoff the engine while the vehicle is stopped. For example, at least factors such as external temperature, historical fuel consumption data, and accessory power loads may influence the crossover time duration at which an engine cutoff saves fuel. The controller may store a lookup table to determine a fuel consumption at idle rate based on the current conditions.

Figure 4:
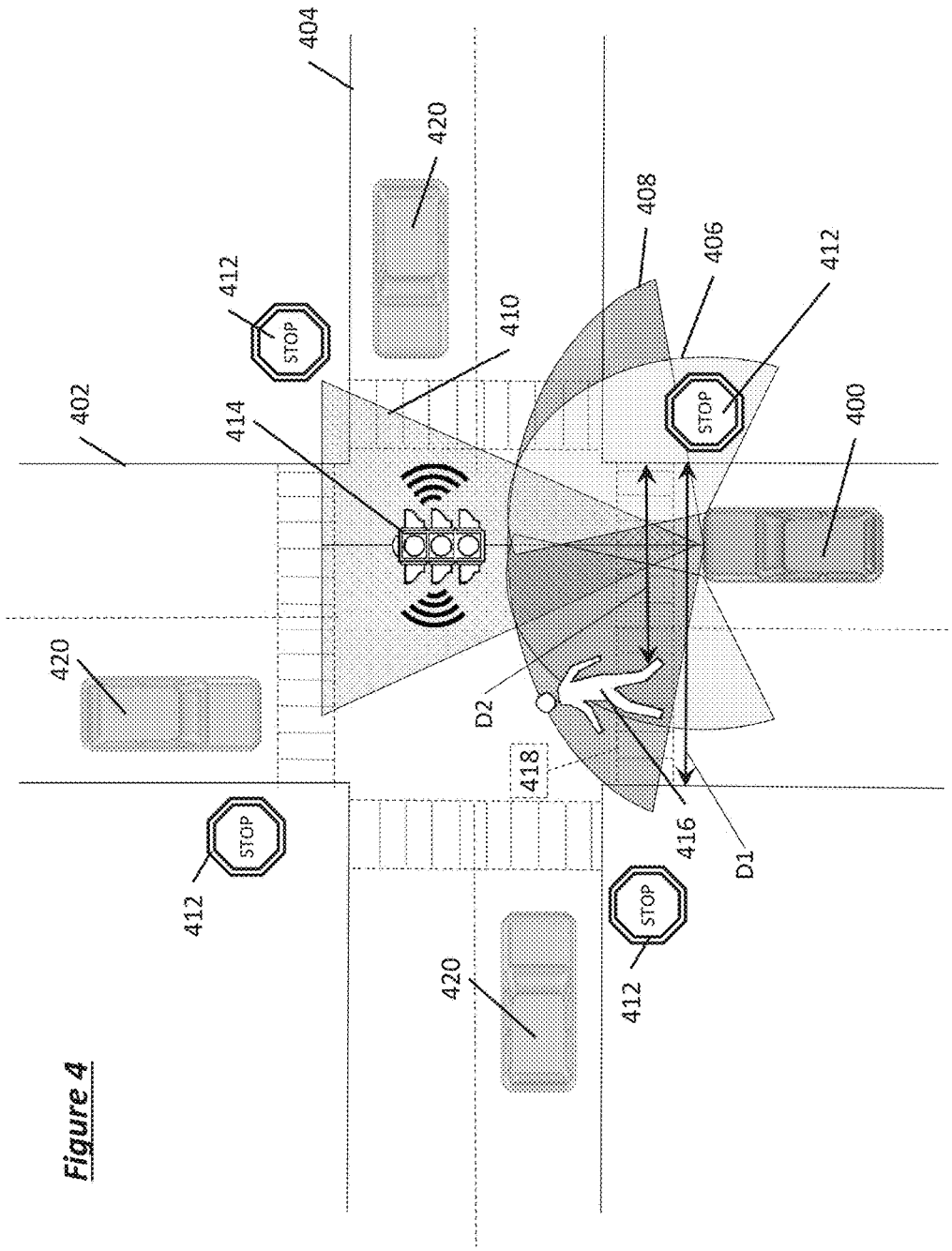
FIG. 4 is a diagram of a host vehicle at an intersection condition.

With reference to FIG. 4, the engine of a host vehicle 400 may be controlled at road intersections based on data received through vehicle connectivity as well as onboard sensors. The host vehicle 400 may approach an intersection of a first road 402 and a second road 404. The host vehicle 400 is equipped with a plurality of sensors configured to output signals indicative of objects within a vicinity of the vehicle. A sensing range 406 may correspond to one or more short range radar (SRR) sensors. A sensing range 408 may correspond to one or more wide field-of-view optical cameras. A sensing range 410 may correspond to one or more LIDAR sensors and/or long range radar (LRR). Output signals from the sensors are provided to the controller as inputs to one or more engine control algorithms. Data from the various sensors may be fused by the controller then used to detect a presence of objects in a vicinity of the host vehicle. Further, portions of the control algorithm may include object recognition such that the controller may make a determination of particular types of objects detected by one or more of the sensors.

The presence of an intersection may prompt the host vehicle 400 to come to a stop. Detection of intersection conditions may be used to inform the engine controller of the driver's upcoming intent regarding propulsion of the vehicle. The controller may determine when the driver will seek to depart from the stopped condition. For example traffic signs 412 within the field of view of one or more cameras may be optically recognized using object recognition algorithms. In one example, the traffic sign 412 may be a stop sign indicating to the engine controller that the vehicle will come to a temporary stop. For a traffic sign such as a stop sign, the controller may store an assigned scalar time value to assume the vehicle will be stopped for a fixed duration of time. Depending on the operating conditions and other factors the set time value assigned to a stop sign may or may not be sufficient to warrant deactivating the engine.

The vehicle may also communicate with infrastructure traffic devices using wireless communication. In one example, a traffic light 414 broadcasts a signal indicative of the state of the light indicators and the remaining duration in the current state. The vehicle controller may use this signal as an input to determine whether the remaining duration of time the vehicle will be stopped is sufficient to warrant deactivating the engine for fuel savings. In other examples, a railroad crossing signal may be configured to actively broadcast the presence a of a train crossing the intersection, and send one or more signals indicative of the remaining duration of time for which the train will be crossing the intersection.

In a further example, the various object detection sensors may be used to detect a moving object in the vicinity of the host vehicle 400. In the example of FIG. 4, a pedestrian 416 may be detected as a moving object while traversing a crosswalk 418 of street 402. Based upon the total distance D1 of the total crosswalk length, the distance D2 traversed by the pedestrian 416, and the rate of travel, the controller may determine a remaining duration of time for which the pedestrian will be in the crosswalk 418. In other examples the controller may determine an upcoming duration of time for which a moving object will be in a vicinity of the host vehicle. The use of rate of movement to determine stopping duration may be useful for engine cutoff for pedestrians, but also for cyclists, other vehicles 420, crossing animals, and the like.

Figure 5:
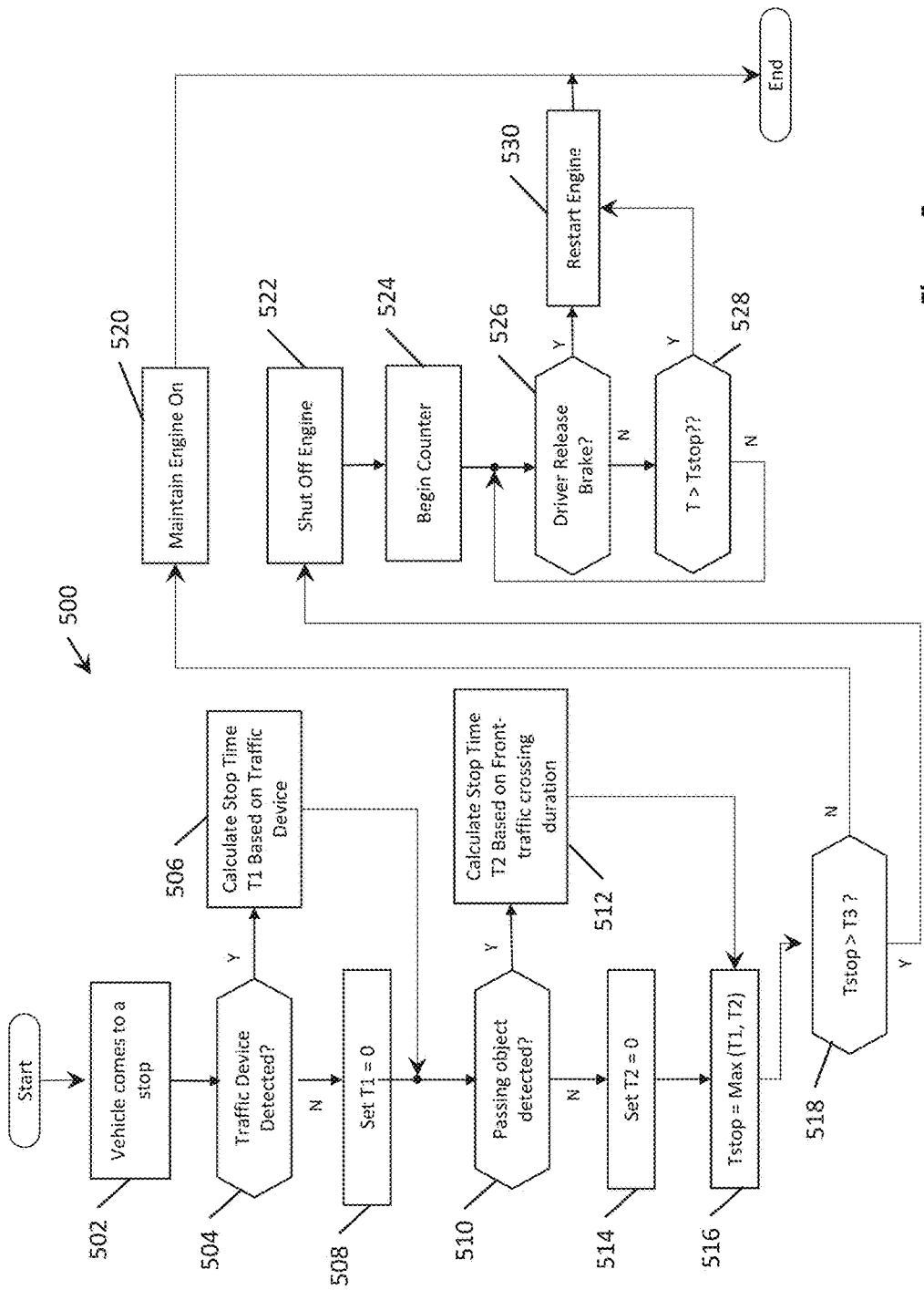
FIG. 5 is a flowchart of a control algorithm of a vehicle departure from a stopped condition.

Referring to FIG. 5 method 500 is an example algorithm logic to determine whether or not to employ the engine stop-start function at a stop using the connectivity data combined with onboard sensor data. At step 502 the algorithm determines when the vehicle has come to a stop. In one example the controller monitors a speed sensor for a stable value reflecting substantially zero speed.

At step 504 the controller determines whether a traffic device has been detected. As discussed above, this may be performed using onboard detection sensors. In certain examples this may further include recognition of a particular type of traffic sign, such as a stop sign as compared to a yield sign or other traffic sign which does not require a stop. Detection of a traffic device may also include wireless V2I communication with nearby devices such as a traffic light. In further examples, the location of traffic devices may be broadcast from an external server using map data and compared to the current GPS location of the host vehicle.

If a traffic device is detected at step 504, the algorithm includes calculating at step 506 a duration of time T1 associated with the detected traffic signal. In one example a predetermined set value is used for T1 based on an assumed duration of the vehicle stop. In examples where the controller receives data transmitted from infrastructure devices, external servers, or other sources the data may include an indication of the duration of time for which the traffic device will prompt the vehicle to remain stopped. The controller may use the received data to set a value for the duration of time T1.

If no traffic device is detected at step 504, the algorithm may store a zero value for the duration of time T1, indicating that the there is no stop time required due to a traffic device.

At step 510 the algorithm includes determining whether there is a moving object passing in the vicinity of the host vehicle. The controller may rely on data output from any of a number of object detection sensors provided onboard the vehicle. In other examples the controller may receive signals transmitted from the moving object itself. For example, a nearby vehicle may broadcast its presence using V2V wireless commination. Additionally a mobile device carried by a pedestrian may similarly broadcast its presence to the host vehicle using V2P (vehicle-to-pedestrian) wireless communication.

At step 512 the algorithm includes calculating a duration of time T2 associated with the time for the detected moving object to pass allowing the host vehicle to depart. The rate of motion of the object is used to calculate the remaining time for the object to cross the intersection. In other examples, the duration assumed to remain stopped is based on the time required for the moving object to pass from the vicinity of the vehicle. Thus duration of time T2 is based on the time that the moving object will remain within the vicinity while the vehicle is stopped. The algorithm may also include a geometric pedestrian zone which is used to calculate an expected duration of stop time to allow a moving object to clear the anticipated path of the host vehicle.

If no moving object is detected at step 510, the algorithm may store a zero value for the duration of time T2, indicating that the there is no stop time required due to a moving object passing before the host vehicle.

At step 516 the algorithm may reconcile multiple causes of a vehicle stop at an intersection. An assumed overall duration of time stopped $T_{stop}$ is determined as the maximum of duration T1 and duration T2. That is, the longer stop time requirement of any of the multiple stopping causes may override shorter stop time durations.

At step 518 the overall duration of time stopped $T_{stop}$ is compared to a time threshold T3 to assess whether the fuel saved from engine deactivation warrants expending the fuel required for a restart following the engine shutdown. Time threshold T3 may vary dynamically and be calculated by the controller on a case-by-case basis. In one example the controller stores a set of lookup tables which take into account present vehicle operating conditions which affect engine idle fuel consumption.

If the expected duration of the stop $T_{stop}$ is less than the time threshold T3, the algorithm maintains the engine in an on state at step 520 and ends algorithm 500 for the current stop event. If sufficient stopping duration is expected at step 518 (i.e., $T_{stop}$>T3), the algorithm causes the engine to shut off at step 522.

Once the engine is shutoff, the algorithm may cause a counter to begin at step 524 to monitor the duration of the stopping event. At step 526 the algorithm monitors for a driver release of the brake pedal which may indicate a driver intention to move the vehicle and depart from the stopped condition. If at step 526 the driver has released the brake, the algorithm causes the engine to restart at step 530.

If at step 526 the driver has maintained the brake, the algorithm monitors the current time T since beginning the counter to monitor for the end of the expected duration of the stop $T_{stop}$. Once the expected time has expired, the algorithm could cause the engine to restart at step 530 to prepare for departure from the stop and avoid any latency in propulsion system torque output.

In alternate examples, the controller may rely on sensor data to continuously monitor the movement of the object in the vicinity of the vehicle, and in response to the object leaving the vicinity sooner than expected, automatically restart the engine in preparation for a departure. For example if a pedestrian increases their rate of movement partially across a crosswalk, the vehicle may be able to depart earlier than forecast.

In a further example, the engine controller may be programmed to apply a speed profile which is based on a setting a particular distance from one or more preceding vehicles. The controller may rely on direct sensing of nearby vehicles using onboard sensors as discussed above. Additionally the controller may rely on data transmitted from one or more preceding vehicles to serve as creep speed guidance.

During extreme traffic congestion where vehicles are prone to frequent stops and creep speeds, it may be advantageous to arrange a predetermined velocity profile to limit vehicle acceleration based on movement of at least one preceding vehicle. For example if the movement of one or more vehicles located is known or forecast to be a creep traffic condition, the engine would consume unnecessary fuel during aggressive vehicle acceleration only to imminently stop. Thus limiting the allowed maximum acceleration under such conditions can be implemented, combined with other engine management features discussed herein. For example, the controller may be programmed to reduce supply power to, or deactivate, certain accessory loads that operate using engine torque while the vehicle is stopped. Additionally, engine output torque may be limited during creep to conserve power during the low speed operation. Further, torque converter clutch lockup may be used to provide efficient transfer of the engine output torque with reduced or eliminated slip. Further still, the controller may cause the transmission to operate in higher gear ratios to improve fuel efficiency under creep conditions without adversely affecting driver perception. An additional feature may combine eco approach strategies as discussed above to coast to provide coasting with DFCO to decelerate while at low speeds.

In a further strategy, a driver advisory system may allow the vehicle to be driven in a manual mode while encouraging the driver to adopt certain driving behaviors. The controller may not directly preempt driver input in the manual driving mode. Instead, the optimal velocity and/or torque profile for a given driving scenario may be used to generate guidance information for the driver. While such guidance applies to the speed profile portions that the driver might manually control, the other engine optimization features may still apply when certain predetermined driving events are forecast. According aspects the present disclosure, a passive engine control strategy is used to provide information to guide the driver towards ideal engine operation techniques such as those discussed above. Such information may be provided in such a way to instructing a driver to perform a particular behavior in any of a number of recognized driving scenarios.

Figure 6:
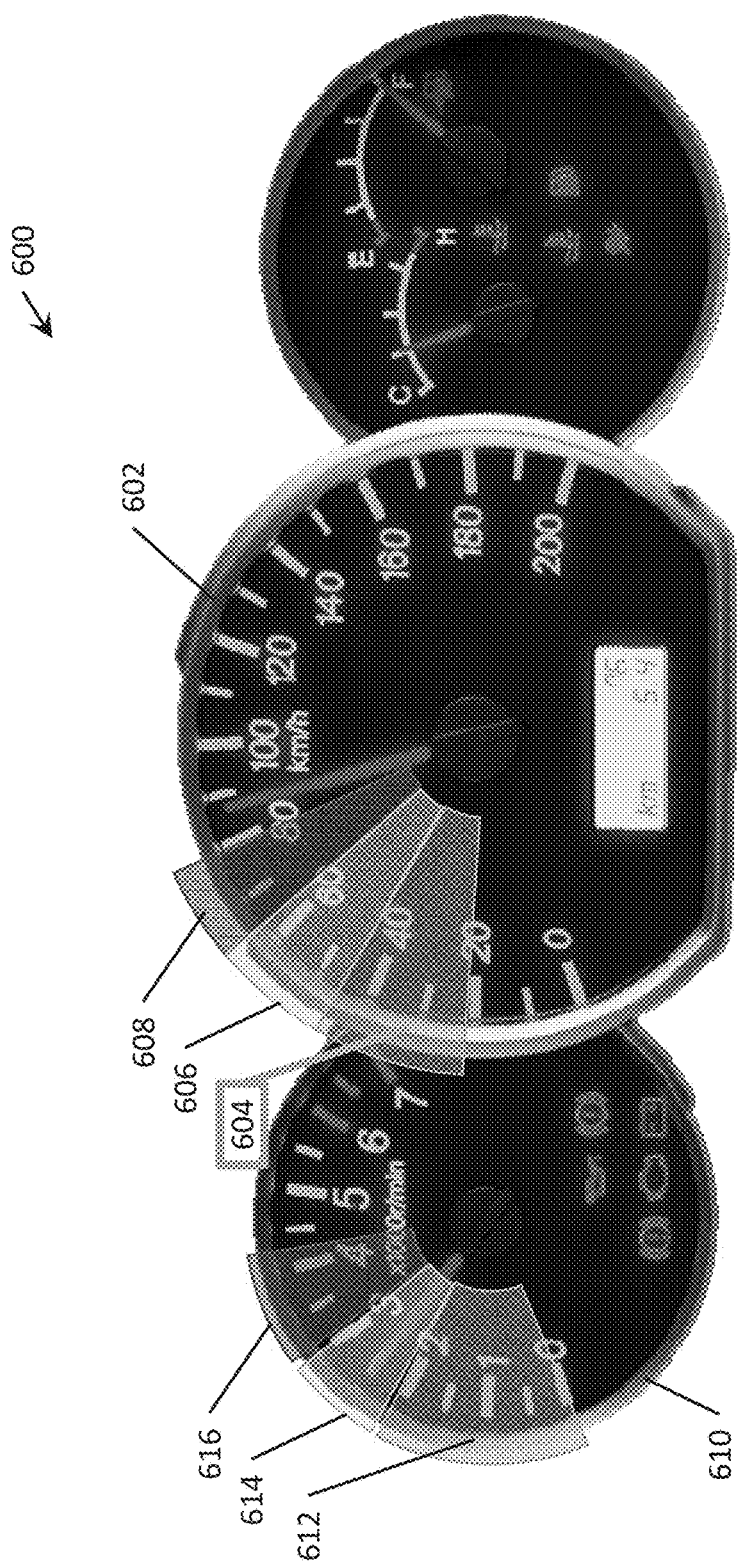
FIG. 6 is a schematic of a vehicle gauge cluster.

Referring to FIG. 6, a visual display is provided at a vehicle gauge cluster 600 to indicate a target performance to be targeted by a driver. For example, speedometer gauge 602 may be equipped with a digital display to indicate performance bands to instruct a driver to drive at speeds near an ideal velocity profile. A first speed band 604 may encompass the most preferred speed at a given time. A second speed band 606 may be a marginal band, and a third speed band 608 may indicate a less than desirable speed range based on the predetermined speed profile. Both of the locations and the widths of the speed bands 604, 606, and 608 may vary dynamically based on changes in vehicle operating conditions and new data received through vehicle connectivity. Optimal speed profiles may be calculated based on vehicle specific characteristics, derived from traffic flow conditions, and/or broadcast data from infrastructure devices. Referring to an example for optimizing fuel economy, speed harmonization (i.e., driving no faster than the flow of traffic) helps to avoid unnecessary acceleration and braking cycles.

Similarly, engine RPM bands may be provided at a tachometer gauge 610 and may be provided instead of or in addition to the speeds bands discussed above. The RPM bands 612, 614, and 616 may indicate ideal, marginal, and less than desirable engine speeds according to optimizing a particular performance attribute of the engine. In one example, the RPM bands correspond to a predetermined torque profile based on sensed data as well as data received via vehicle connectivity.

Alternatively, other driver guidance may be provided to instruct a driver to achieve certain performance objectives. In one example display messages including driving instructions are displayed. In a more specific example a display message such as "STOP AHEAD—SLOW DOWN" may be displayed in response to the forecasting of an upcoming stopping condition. Much like previous example the stopping condition may be forecast by the controller using any of onboard sensors to detect traffic devices or preceding stopped vehicles, as well as signals broadcast from infrastructure devices.

A second guidance message example may concern metering vehicle departure. A display message such as "ACCELERATE GENTLY" may be generated in response to traffic conditions to instruct the driver to operate the engine at higher efficiency points. And, as discussed above, during heavy traffic conditions gentle acceleration is sufficient to keep up with traffic without compromising driver performance expectations.

In further examples, haptic feedback at a steering wheel, through a driver's seat, or through accelerator and/or brake pedals may be used to provide guidance information to a driver regarding driving style. Similarly, audible messages may be generated to instruct driving behavior according to a predetermined speed and/or torque profile based on forecast driving events realized through analysis of sensed and connectivity data.

Such driver guidance information may be used to train drivers to drive according to any of a number of driving styles. Any of the styles may be optimized for any number of performance attributes. While fuel economy is discussed in various examples above, other performance attributes can be optimized using connectivity data and forecasting upcoming events. In an additional example, an ideal speed profile may be established along a racing route based on upcoming driving events or maneuvers along the route. Current speed, location along a track, and upcoming track grade and curvature may all be used to develop and optimal speed and/or engine torque profile so as to minimize a lap time.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle engine system comprising:
a combustion engine configured to provide a propulsion torque to satisfy a propulsion demand in response to a driver input;
a controller programmed to receive data indicative of at least one upcoming driving event, and issue a command to impart a predetermined velocity profile based on the at least one upcoming driving event, wherein the predetermined velocity profile is arranged to optimize a performance attribute of the combustion engine and preempt the driver input;
wherein the at least one upcoming driving event includes detection of a pedestrian in a crosswalk, and the controller is further programmed to:
generate a forecasted duration as a remaining duration of time for the pedestrian in the crosswalk, the forecasted duration being based at least partially on a total length of the crosswalk, a distance traversed by the pedestrian and a pedestrian traversal speed; and
deactivate the engine in response to the forecasted duration being greater than a predetermined time threshold.

2. The vehicle engine system of claim 1 wherein the at least one upcoming driving event includes a traffic creep condition and the predetermined velocity profile limits a vehicle acceleration based on movement of at least one preceding vehicle.

3. The vehicle engine system of claim 1 wherein the at least one upcoming driving event includes a stopping event, and the predetermined velocity profile is configured to minimize fuel consumption during a vehicle deceleration toward the stopping event.

4. The vehicle engine system of claim 1 wherein the at least one upcoming driving event includes a congested traffic flow condition and the received data is a broadcast homogenous speed, and wherein the predetermined velocity profile limits vehicle speed to be less than the broadcast homogeneous speed.

5. The vehicle engine system of claim 1, further comprising:
an object detection sensor configured to monitor a movement of the pedestrian while traversing the crosswalk; and
wherein the controller is further programmed to automatically restart the engine in response to the pedestrian leaving the crosswalk prior to the forecasted duration.

6. The vehicle engine system of claim 1 wherein the controller is further programmed to generate a user display indicative of at least one of a target RPM and a target vehicle speed corresponding to the predetermined velocity profile.

7. A method of controlling a vehicle propulsion system comprising:
receiving a driver input indicative of torque demand;
receiving data indicative of at least one of static route data and dynamic route data;
forecasting at least one upcoming driving event based on the received data, the at least one upcoming driving event including detection of a pedestrian in a crosswalk;
generating a forecasted duration as a remaining duration of time for the pedestrian in the crosswalk, the forecasted duration being based at least partially on a total length of the crosswalk, a distance traversed by the pedestrian and a pedestrian traversal speed; and
adjusting an engine output torque to optimize a performance parameter according to a selected propulsion mode and preempt the driver input, wherein adjusting the engine output torque includes deactivating the engine in response to the forecasted duration being greater than a predetermined time threshold.

8. The method of claim 7 wherein adjusting the engine output torque includes imparting a predetermined torque profile based on the at least one upcoming driving event.

9. The method of claim 8 wherein the at least one upcoming driving event includes a vehicle stopping event and the predetermined torque profile causes operation of the engine substantially near an ideal operating point.

10. The method of claim 8 wherein the dynamic route data includes information regarding a traffic creep condition and the predetermined torque profile limits a vehicle acceleration based on movement of a preceding vehicle.

11. The method of claim 8 wherein the dynamic route data includes information regarding a traffic flow condition and the predetermined torque profile is based on operating the engine to synchronize vehicle speed with a traffic flow speed.

12. The method of claim 11 wherein the dynamic route data includes a broadcast homogeneous speed target.

13. The method of claim 8 further comprising providing an indicator to a driver for at least one of a target speed and the target RPM corresponding to the predetermined torque profile.

14. The method of claim 7 further wherein adjusting the engine output torque includes at least one of (i) cutting off a fuel supply during deceleration, (ii) modifying a transmission gear ratio shift schedule, and (iii) deactivating at least one cylinder of the engine.

* * * * *